Aug. 2, 1927.
L. E. LA BRIE
1,637,527
WHEEL
Filed Oct. 24, 1925
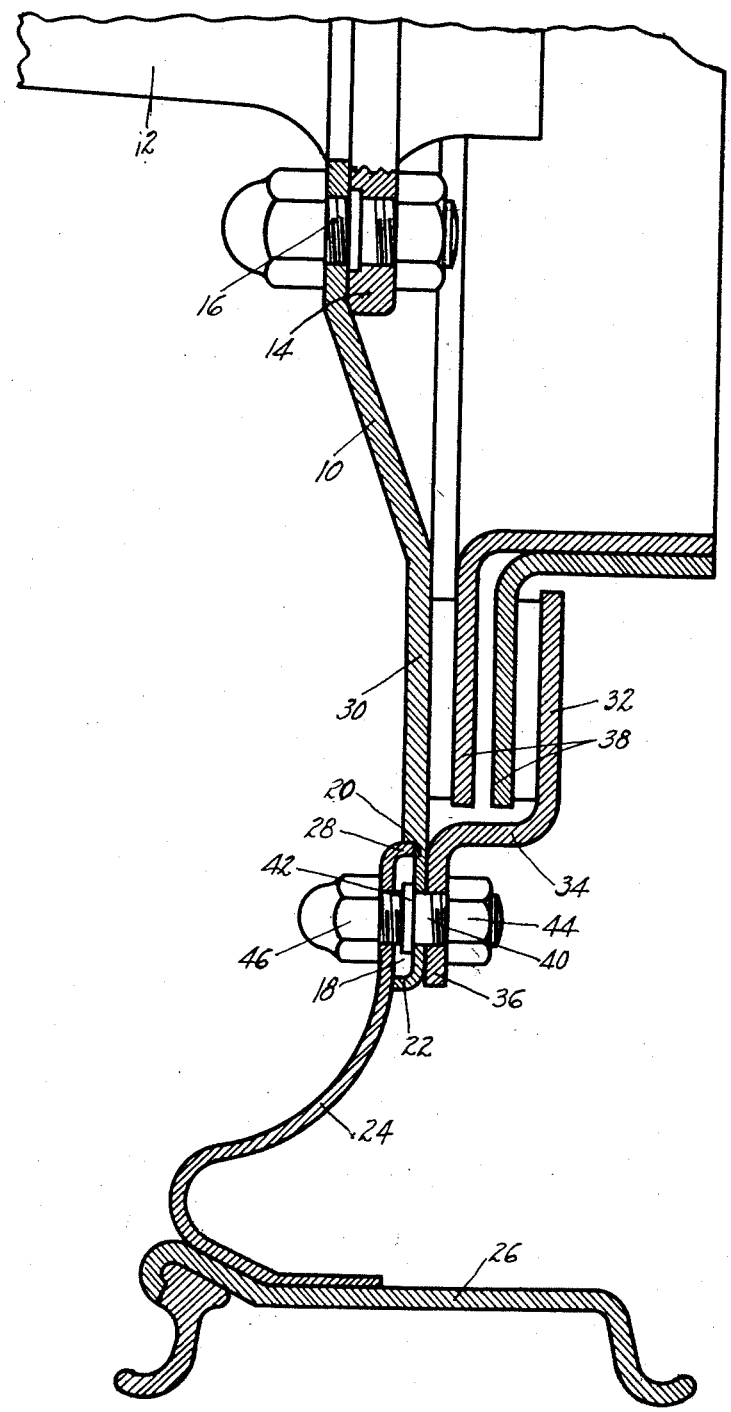
INVENTOR
LUDGER E. LaBRIE
BY
M. W. McConkey
ATTORNEY Patented Aug. 2, 1927.

1,637,527

UNITED STATES PATENT OFFICE.

LUDGER ELIZE LA BRIE, OF SOUTH BEND, INDIANA, ASSIGNOR TO MOTOR INDUSTRIES, INC., OF CHICAGO, ILLINOIS, A CORPORATION OF ILLINOIS.

WHEEL.

Application filed October 24, 1925. Serial No. 64,662.

This invention relates to wheels, and is illustrated as embodied in a disk wheel for an automobile. An object of the invention is to provide a strong but inexpensive wheel, readily demountable for changing tires, and adapted for use with an expanding disk brake. Preferably there is an annular outer demountable disk which carries the rim. The inner disk is formed with an inner radial friction surface opposite and parallel to a radial friction flange on a separate drum part.

The features of novelty, and desirable details of construction, will be apparent from the following description of one illustrative embodiment shown in the accompanying drawing, in which:

The figure is a radial section through one-half of the wheel.

In the particular arrangement shown, the inner disk 10 is separate from the hub 12, and is secured to a flange 14 of the hub by bolts or other fastenings 16. Just inside its outer edge, disk 10 is grooved or rabbeted at 18 to form a circular shoulder 20 and an outer edge flange 22.

Outer disk 24, carrying the rim 26, is engaged on its inner face by flange 22, and has at its inner edge a laterally-projecting flange 28 resting on the shoulder 20.

On its inner face, within the outline of shoulder 20, disk 10 has a radial friction surface 30 opposite and parallel to a radial friction flange 32 on a drum part 34 offset from disk 10, and having a flange 36 overlapping the outer part of disk 10 beyond the outline of shoulder 20. Between surface 30 and flange 32 are arranged axially-separable or expansible annular friction disks 38 forming part of a disk brake.

Bolts or equivalent fastenings 40, threaded at both ends, have collars 42 engaging the side of rabbet 18, and project through disk 10 and flange 36 toward the right, and through disk 24 toward the left. Nuts 44 secure flange 36 to the inner disk, while cap nuts 46 secure the outer disk 24 to the inner disk, tensioning it between flanges 28 and 22 to form a tight joint.

While one illustrative embodiment has been described in detail, it is not my intention to limit the scope of the invention to that particular embodiment, or otherwise than by the terms of the appended claims.

I claim:

1. A wheel comprising an inner disk having a substantially radial friction surface on its inner face adjacent its outer edge, a drum part secured to the disk at its outer edge and offset inwardly and then continued as a radial friction flange opposite and parallel to said friction surface, and an annular outer rim-carrying disk secured also to the inner disk at its outer edge.

2. A wheel comprising an inner disk having a substantially radial friction surface on its inner face adjacent its outer edge, a drum part secured to the disk at its outer edge and offset inwardly and then continued as a radial friction flange opposite and parallel to said friction surface, an annular outer rim-carrying disk secured also to the inner disk at its outer edge, and common fastenings for securing the two disks and the drum part together.

3. A wheel comprising, in combination, an inner disk rabbeted a short distance from its outer edge to form a circular shoulder and having a radial friction surface on its inner side within the outline of said shoulder, a drum part having a flange overlapping the outer part of the inner disk on its inner side outside the outline of said shoulder, thence offset inwardly and continued as a radial friction flange opposite and parallel to said friction surface, an annular outer rim-carrying disk seated at its inner edge on said shoulder, and fastenings passing through the disks and the overlapping flange of the drum part.

4. A wheel comprising, in combination, an inner disk rabbeted a short distance from its outer edge to form a circular shoulder and having a radial friction surface on its inner side within the outline of said shoulder, a drum part having a flange overlapping and secured to the outer part of the inner disk on its inner side outside the outline of said shoulder, thence offset inwardly and continued as a radial friction flange opposite and parallel to said friction surface, and an annular outer rim-carrying disk seated at its inner edge on said shoulder and secured to the inner disk.

5. A wheel comprising, in combination, an inner disk having an inner annular radial friction surface adjacent its outer edge, a drum part engaging the inner disk adjacent its outer edge and formed with a radial friction flange opposite and parallel to said surface, an outer annular rim-carrying disk overlapping at its inner edge the outer part of the inner disk, fastenings threaded at both ends and having collars engaging the outer face of the inner disk and projecting through the inner disk and through said drum part, nuts on the inner ends of the fastenings securing the drum part to the inner disk, and nuts on the outer ends of the fastenings securing the outer disk to the inner disk.

6. A wheel comprising, in combination, an inner disk having an inner annular radial friction surface adjacent its outer edge, a drum part engaging the inner disk adjacent its outer edge and formed with a radial friction flange opposite and parallel to said surface, an outer annular rim-carrying disk overlapping at its inner edge the outer part of the inner disk, and means for fastening the disks and the drum part together.

In testimony whereof, I have hereunto signed my name.

LUDGER ELIZE LA BRIE.